United States Patent
Cheung et al.

(10) Patent No.: US 11,840,636 B2
(45) Date of Patent: *Dec. 12, 2023

(54) WATER-RESISTANT ACRYLIC COATINGS

(71) Applicant: BMIC LLC, Dallas, TX (US)

(72) Inventors: Wilson Cheung, Hillsborough, NJ (US); Benjamin Pearl, Morristown, NJ (US); Kihyun Kim, Hackensack, NJ (US); Adem Chich, Kearny, NJ (US); Daniel E. Boss, Morristown, NJ (US); Michael Hagen, Parsippany, NJ (US)

(73) Assignee: BMIC LLC, Dallas, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/169,179

(22) Filed: Feb. 5, 2021

(65) Prior Publication Data

US 2021/0171794 A1 Jun. 10, 2021

Related U.S. Application Data

(63) Continuation of application No. 16/944,880, filed on Jul. 31, 2020, now Pat. No. 10,995,233.

(60) Provisional application No. 62/881,995, filed on Aug. 2, 2019, provisional application No. 63/015,963, filed on Apr. 27, 2020.

(51) Int. Cl.
*C09D 133/08* (2006.01)
*C08K 13/02* (2006.01)

(52) U.S. Cl.
CPC ............ *C09D 133/08* (2013.01); *C08K 13/02* (2013.01)

(58) Field of Classification Search
CPC .............................. C09D 133/08; C08K 13/02
See application file for complete search history.

(56) References Cited

U.S. PATENT DOCUMENTS

| | | | |
|---|---|---|---|
| 5,017,632 A | 5/1991 | Bredow et al. | |
| 5,225,453 A | 7/1993 | Yamamori | |
| 5,965,257 A | 10/1999 | Ahluwalia | |
| 7,550,205 B2 | 6/2009 | Getlichermann et al. | |
| 8,741,388 B2 | 6/2014 | Wickert et al. | |
| 8,900,651 B2 | 12/2014 | McClain et al. | |
| 9,073,294 B2 | 7/2015 | Kumar et al. | |
| 9,074,065 B2 | 7/2015 | Rieth et al. | |
| 9,359,520 B2 | 6/2016 | Killilea et al. | |
| 9,371,476 B1 | 6/2016 | Osae et al. | |
| 9,434,828 B2 | 9/2016 | Fuhry et al. | |
| 9,557,449 B2 | 1/2017 | Valeri | |
| 9,695,367 B2 | 7/2017 | Hoyles et al. | |
| 9,850,396 B2 | 12/2017 | Xu et al. | |
| 10,066,051 B2 | 9/2018 | Cochran et al. | |
| 10,093,821 B2 | 10/2018 | Xu et al. | |
| 10,533,108 B2 | 1/2020 | Bene et al. | |
| 10,538,675 B2 | 1/2020 | Patena et al. | |
| 10,745,583 B2 | 8/2020 | Zhan et al. | |
| 10,927,238 B2 | 2/2021 | Blackman et al. | |
| 10,934,449 B2 | 3/2021 | Shi et al. | |
| 10,947,387 B2 | 3/2021 | Alvarado et al. | |
| 10,995,233 B2 * | 5/2021 | Cheung ................ | C09D 133/08 |
| 11,001,734 B2 | 5/2021 | Young et al. | |
| 11,136,471 B2 | 10/2021 | Jang | |
| 2004/0063807 A1 | 4/2004 | Wang et al. | |
| 2005/0209382 A1 | 9/2005 | Yale et al. | |
| 2008/0188603 A1 | 8/2008 | Porzio et al. | |
| 2008/0269405 A1 | 10/2008 | Okamoto et al. | |
| 2010/0062260 A1 | 3/2010 | Takano et al. | |
| 2010/0126384 A1 | 5/2010 | Bene et al. | |
| 2012/0088052 A1 | 4/2012 | Rodriguez et al. | |
| 2013/0236674 A1 | 9/2013 | Kim et al. | |
| 2015/0094421 A1 | 4/2015 | Patel et al. | |
| 2016/0096970 A1 | 4/2016 | Hartley et al. | |
| 2016/0194511 A1 | 7/2016 | Perdigon et al. | |
| 2020/0115569 A1 | 4/2020 | Cagle et al. | |
| 2020/0270491 A1 | 8/2020 | Li et al. | |
| 2020/0369882 A1 | 11/2020 | Wang et al. | |
| 2021/0155721 A1 | 5/2021 | Zeng et al. | |
| 2021/0261768 A1 | 8/2021 | Watanabe | |
| 2021/0261812 A1 | 8/2021 | Krall et al. | |

FOREIGN PATENT DOCUMENTS

| | | |
|---|---|---|
| WO | 2013043579 A1 | 3/2013 |
| WO | 2014035723 A1 | 3/2014 |
| WO | 2019152275 A1 | 8/2019 |

OTHER PUBLICATIONS

Baumstark et al., Acrylic Latex Paints: a Comparative Study (Part II); European Coating Journal, No. 5, 2001.

* cited by examiner

*Primary Examiner* — Edward J Cain

(74) *Attorney, Agent, or Firm* — Greenberg Traurig, LLP

(57) ABSTRACT

Water-resistant waterborne acrylic coating materials, systems and methods providing enhanced water resistance and durability are provided. Such coatings extend the service life of roofing systems that are exposed to ponding water and other extreme weather conditions. Coatings described herein exhibit superior water resistance attributes including one or more of water infiltration resistance, wet tensile strength and wet adhesion.

15 Claims, No Drawings

WATER-RESISTANT ACRYLIC COATINGS

CROSS-REFERENCE TO RELATED APPLICATIONS

This application claims priority to U.S. application Ser. No. 16/944,880, filed on Jul. 31, 2020 and entitled "WATER-RESISTANT ACRYLIC COATINGS," which claims priority to U.S. Provisional Application 62/881,995, filed on Aug. 2, 2019 and entitled "WATER-RESISTANT ACRYLIC COATINGS," and U.S. Provisional Application 63/015,963, filed on Apr. 27, 2020 and entitled "WATER-RESISTANT ACRYLIC COATINGS," all of which are herein incorporated by reference in their entirety.

BACKGROUND

Among the most significant properties of commercial and residential roofing systems is water resistance. The durability and service life of roofing systems largely depends upon its ability to prevent water infiltration and to provide sustained mechanical properties, such as wet tensile strength and wet adhesion, in applicable environmental conditions. Ponding is the occurrence of water pooling on flat roofs or localized flat roofing sections from exposure to storms, snow melts, heavy rains or other wet conditions. Generally, conventional roof systems are simply not designed to hold water for prolonged durations. Ponding water can collect dirt, which may cause the growth of vegetation and biofilm or telegraph mud cracking and chipping. It can also act as a magnifying glass on the roof under the pond, thus possibly increasing ultraviolet exposure and causing localized damage. It can also contribute to photo-oxidation and resultant premature deterioration of the roof membrane, flashings and coatings. Ultimately, these and other effects can lead to structural damage and possible roof collapse.

Waterborne roof coatings, most notably acrylic coatings, are commonly used to extend roof service life. Acrylic coatings are eco-friendly and exhibit a combination of benefits including high reflectivity, re-coatability, good adhesion to multiple substrates and desirable mechanical properties. Failures of known acrylic coatings may include micro-cracking, delamination or de-bonding, and biofilm attachment, which can lead to cracking, chipping, etc., and ultimately to structural damage of the underlying roof structure. One of the advantages of the coating materials, systems and methods provided herein is to address these known failures by providing acrylic coating systems that are resistant to ponding water failures while retaining the benefits of waterborne coatings.

SUMMARY

Described herein are water-resistant waterborne acrylic coating materials, systems and methods providing enhanced water resistance and durability. Such coatings extend the service life of roofing systems that are exposed to ponding water and other extreme weather conditions. Coatings described herein exhibit superior water resistance attributes including one or more of water infiltration resistance, wet tensile strength and wet adhesion. Resultant coatings are resistant to ponding water failures upon long-term exposure to standing water environment, wet-dry cycling and other thermal cycle stresses.

In one aspect, a coating material is provided, which is suitable for application to a roofing substrate, among other uses. In certain embodiments, the coating material comprises at least one acrylic latex resin, at least one functional filler, and at least one hydrophobic additive.

In certain embodiments, when the coating material is applied as a coating to the roofing substrate, the coating exhibits a water infiltration depth of about 120 microns or less after 4 hours at 60° C. and 95% relative humidity.

In certain embodiments, when the coating material is applied as a coating to the roofing substrate, the coating exhibits a wet tensile strength of at least about 80 psi as measured according to ASTM D882 and/or ASTM D2370. In embodiments, when the coating material is applied as a coating to the roofing substrate, the coating exhibits a wet tensile strength of about 80 psi to about 500 psi as measured according to ASTM D882 and/or ASTM D2370. In embodiments, when the coating material is applied as a coating to the roofing substrate, the coating exhibits a wet tensile strength of about 85 psi to about 500 psi as measured according to ASTM D882 and/or ASTM D2370. In embodiments, when the coating material is applied as a coating to the roofing substrate, the coating exhibits a wet tensile strength of about 90 psi to about 500 psi as measured according to ASTM D882 and/or ASTM D2370. In embodiments, when the coating material is applied as a coating to the roofing substrate, the coating exhibits a wet tensile strength of about 95 to about 500 psi as measured according to ASTM D882 and/or ASTM D2370.

In certain embodiments, when the coating material is applied as a coating to the roofing substrate, the coating exhibits a wet adhesion of at least about 2 pli (pounds per linear inch) as measured according to ASTM D903. In embodiments, when the coating material is applied as a coating to the roofing substrate, the coating exhibits a wet adhesion of about 2 pli to about 15 pli as measured according to ASTM D903. In embodiments, when the coating material is applied as a coating to the roofing substrate, the coating exhibits a wet adhesion of about 3 pli to about 15 pli as measured according to ASTM D903. In embodiments, when the coating material is applied as a coating to the roofing substrate, the coating exhibits a wet adhesion of about 4 pli to about 15 pli as measured according to ASTM D903. In embodiments, when the coating material is applied as a coating to the roofing substrate, the coating exhibits a wet adhesion of about 5 pli to about 15 pli as measured according to ASTM D903. In embodiments, when the coating material is applied as a coating to the roofing substrate, the coating exhibits a wet adhesion of about 6 pli to about 15 pli as measured according to ASTM D903. In embodiments, when the coating material is applied as a coating to the roofing substrate, the coating exhibits a wet adhesion of about 7 pli to about 15 pli as measured according to ASTM D903. In embodiments, when the coating material is applied as a coating to the roofing substrate, the coating exhibits a wet adhesion of about 8 pli to about 15 pli as measured according to ASTM D903. In embodiments, when the coating material is applied as a coating to the roofing substrate, the coating exhibits a wet adhesion of about 9 pli to about 15 pli as measured according to ASTM D903. In embodiments, when the coating material is applied as a coating to the roofing substrate, the coating exhibits a wet adhesion of about 10 pli to about 15 pli as measured according to ASTM D903. In embodiments, when the coating material is applied as a coating to the roofing substrate, the coating exhibits a wet adhesion of about 11 pli to about 15 pli as measured according to ASTM D903. In embodiments, when the coating material is applied as a coating to the roofing substrate, the coating exhibits a wet adhesion of about 12 pli to about 15 pli as measured according to ASTM D903. In embodiments, when the coating material is applied as a coating to the roofing substrate, the coating exhibits a wet adhesion of about 13 pli to about 15 pli as measured according to ASTM D903. In embodiments, when the coating material is applied as a coating to the roofing substrate, the coating exhibits a wet adhesion of about 14 pli to about 15 pli as measured according to ASTM D903.

In certain embodiments, the acrylic latex resin is selected from the group consisting of hydrophobic resins, self-crosslinking resins, and crosslinkable resins.

In certain embodiments, the content of the at least one acrylic latex resin within the coating material is about 20-70 weight percent. In other embodiments, the content of the at least one acrylic latex resin within the coating material is about 30-70 weight percent. In other embodiments, the content of the at least one acrylic latex resin within the coating material is about 40-70 weight percent. In other embodiments, the content of the at least one acrylic latex resin within the coating material is about 50-70 weight percent. In other embodiments, the content of the at least one acrylic latex resin within the coating material is about 20-60 weight percent. In other embodiments, the content of the at least one acrylic latex resin within the coating material is about 20-50 weight percent. In other embodiments, the content of the at least one acrylic latex resin within the coating material is about 20-40 weight percent. In other embodiments, the content of the at least one acrylic latex resin within the coating material is about 20-30 weight percent. In other embodiments, the content of the at least one acrylic latex resin within the coating material is about 25-65 weight percent. In other embodiments, the content of the at least one acrylic latex resin within the coating material is about 30-60 weight percent. In other embodiments, the content of the at least one acrylic latex resin within the coating material is about 35-55 weight percent. In other embodiments, the content of the at least one acrylic latex resin within the coating material is about 35-50 weight percent.

In certain embodiments, the content of at least one functional filler within the coating material is about 10-50 weight percent. In other embodiments, the content of at least one functional filler within the coating material is about 10-40 weight percent. In other embodiments, the content of at least one functional filler within the coating material is about 10-30 weight percent. In other embodiments, the content of at least one functional filler within the coating material is about 10-20 weight percent. In other embodiments, the content of at least one functional filler within the coating material is about 20-50 weight percent. In other embodiments, the content of at least one functional filler within the coating material is about 30-50 weight percent. In other embodiments, the content of at least one functional filler within the coating material is about 40-50 weight percent. In other embodiments, the content of at least one functional filler within the coating material is about 15-45 weight percent. In other embodiments, the content of at least one functional filler within the coating material is about 20-45 weight percent. In other embodiments, the content of at least one functional filler within the coating material is about 25-45 weight percent. In other embodiments, the content of at least one functional filler within the coating material is about 30-45 weight percent. In other embodiments, the content of at least one functional filler within the coating material is about 35-40 weight percent.

In certain embodiments, the functional filler is selected from the group consisting of silicate minerals, silica, wollastonite (calcium inosilicate mineral $CaSiO_3$), talc, mica, kaolin, feldspar, nepheline syenite, nanoclays, platy fillers, nano-oxide materials, calcium carbonate, aluminum hydroxide, magnesium hydroxide, aluminum tryhydrate, basalt, zinc oxide, barium sulfate, and combinations thereof. In certain embodiments, the functional filler is characterized by a high aspect ratio, which can enhance tensile strength of the coating material while retaining water infiltration resistance and wet adhesion. In embodiments, the aspect ratio of the functional filler is about 3-100. In embodiments, the aspect ratio of the functional filler is about 5-100. In embodiments, the aspect ratio of the functional filler is about 10-100. In embodiments, the aspect ratio of the functional filler is about 15-100. In embodiments, the aspect ratio of the functional filler is about 20-100. In embodiments, the aspect ratio of the functional filler is about 25-100. In embodiments, the aspect ratio of the functional filler is about 30-100. In embodiments, the aspect ratio of the functional filler is about 35-100. In embodiments, the aspect ratio of the functional filler is about 40-100. In embodiments, the aspect ratio of the functional filler is about 45-100. In embodiments, the aspect ratio of the functional filler is about 50-100. In embodiments, the aspect ratio of the functional filler is about 55-100. In embodiments, the aspect ratio of the functional filler is about 60-100. In embodiments, the aspect ratio of the functional filler is about 65-100. In embodiments, the aspect ratio of the functional filler is about 70-100. In embodiments, the aspect ratio of the functional filler is about 75-100. In embodiments, the aspect ratio of the functional filler is about 80-100. In embodiments, the aspect ratio of the functional filler is about 85-100. In embodiments, the aspect ratio of the functional filler is about 90-100. In embodiments, the aspect ratio of the functional filler is about 95-100. In embodiments, the functional filler is a high aspect ratio filler comprising wollastonite, talc, clays and/or mica. The inventors have found that when embodiments of the coating material containing one or more functional fillers having an aspect ratio of about 3-100 are applied as a 500 micron dry film thickness coating to a roofing substrate, the coating exhibits a greater dry tensile strength than a test coating on a roofing substrate applied with an identical coating material without the one or more functional fillers having an aspect ratio of about 3-100.

In certain embodiments, the content of at least one hydrophobic additive is about 0.5-20 weight percent. In other embodiments, the content of at least one hydrophobic additive is about 0.5-10 weight percent. In other embodiments, the content of at least one hydrophobic additive is about 1-5 weight percent. In other embodiments, the content of at least one hydrophobic additive is about 1-3 weight percent. In other embodiments, the content of at least one hydrophobic additive is about 1-2 weight percent.

In certain embodiments, the hydrophobic additive is selected from the group consisting of hydrophobic copolymer dispersants and salts thereof, nonionic rheology modifiers, PTFE powders, silicone surface additive, polyolefin powder with having molecular weight within the range 100,000-1,000,000 Daltons, polyolefin wax and hydrophobic wax dispersions.

In certain embodiments, coating material further comprises a pigment. In certain of these embodiments, the content of the pigment is 2-15 weight percent. In other embodiments, the content of the pigment is 3-15 weight percent. In other embodiments, the content of the pigment is 4-15 weight percent. In other embodiments, the content of the pigment is 5-15 weight percent. In other embodiments, the content of the pigment is 6-15 weight percent. In other embodiments, the content of the pigment is 7-15 weight percent. In other embodiments, the content of the pigment is 8-15 weight percent. In other embodiments, the content of the pigment is 9-15 weight percent. In other embodiments, the content of the pigment is 10-15 weight percent. In other embodiments, the content of the pigment is 11-15 weight percent. In other embodiments, the content of the pigment is 12-15 weight percent. In other embodiments, the content of the pigment is 13-15 weight percent. In other embodiments, the content of the pigment is 14-15 weight percent. In other embodiments, the content of the pigment is 2-14 weight percent. In other embodiments, the content of the pigment is 2-13 weight percent. In other embodiments, the content of the pigment is 2-12 weight percent. In other embodiments, the content of the pigment is 2-11 weight percent. In other embodiments, the content of the pigment is 2-10 weight percent. In other embodiments, the content of the pigment is 2-9 weight percent. In other embodiments, the content of the pigment is 2-8 weight percent. In other embodiments, the content of the pigment is 2-7 weight percent. In other embodiments, the content of the pigment is 2-6 weight percent. In other embodiments, the content of the pigment is 2-5 weight percent. In other embodiments, the content of the pigment is 2-4 weight percent. In other embodiments, the content of the pigment is 2-3 weight percent.

In certain embodiments, coating material further comprises a crosslinking agent. In another aspect, a coating system is provided that comprises a roofing substrate and a coating material at least partially coating the roofing substrate, wherein the coating material comprises at least one acrylic latex resin, at least one functional filler, and at least one hydrophobic additive. The roofing substrate comprises any suitable material or structure used in commercial or residential roofing applications, including underlayment and flashing.

In yet another aspect, a coating method is provided that comprises the application of a coating material to a roofing substrate, where the coating material comprises at least one acrylic latex resin, at least one functional filler, and at least one hydrophobic additive.

DETAILED DESCRIPTION

The coating materials provided herein generally comprise at least one acrylic latex resin, at least one functional filler, and at least one hydrophobic additive. The inventors have found that such materials exhibit superior water resistance properties, including preventing water infiltration while providing high wet tensile strength and wet adhesion, thus providing durable roofing systems even under ponding conditions when applied to roofing substrates.

The acrylic latex resins used in embodiments described herein include hydrophobic resins, self-crosslinking resins, and/or crosslinkable resins. Examples of commercially-available self-crosslinking acrylics include Acronal® (BASF SE European Company) 4848, Ecronova® (Mallard Creek Polymers, Inc.) series such as grade 6608, Centurion® (The Dow Chemical Company), and UCAR™ (Arkema Inc.) Latex 9176. Examples of crosslinkable acrylics include Acrylics Rovene® (Mallard Creek Polymers, Inc.) 6119, acrylic resin grades with carboxylic acid end groups and an acid number (e.g. >8 mg/100 g), and Asahi Polydurex B3120 acrylic-silane core-shell hybrid. Examples of hydrophobic resins include Syntran® (Interpolymer Corporation) 6211, Rovene® (Mallard Creek Polymers, Inc.) 6120, and Neocar® (Arkema Inc.) 820, 2300, 850. Where crosslinkable resins are used, embodiments may optionally include one or more known chemical crosslinking agents such as carbodiimide such as Carbodilite® (Nisshinbo Holdings Inc.) and water stable epoxy silane such as Coatosil® (Momentive Performance Materials Inc.) 2287.

The functional fillers used in embodiments described herein provide enhanced properties such as tensile, water resistance and adhesion properties. Examples of such fillers include silicate minerals, silica, wollastonite, talc, mica, kaolin, feldspar, and nepheline syenite, surface treated fillers and sub-micron fillers such as nanoclays, platy fillers and nano-oxides commonly used in anti-corrosion coatings. Without wishing to be bound by theory, the inventors believe that the incorporation of the nano-fillers creates a tortuous pathway for water permeation, limiting water absorption and adverse solvation effect on the coating. Examples of surface treated fillers include calcium carbonates, Camel-Wite™ ST (Imerys), aluminum trihydrate (low solubility) such as Hymod® (J.M. Huber Corporation) Micral grades, and Hymod M9400 SG & Hymod SB432-SG-surface treated grade. Other functional fillers are hydrophobic in nature and include Novakup® and Novacite® (Malvern Minerals Company) platy silica, treated and non-treated fumed silicas, Aerosil® (Evonik Degussa GmbH), Oxylink™ (Micronisers Australasia Pty Ltd.), pre-dispersed nano $ZnO_2$, and nano-kaolin, -bentonite, and -monomonilorite clays.

The hydrophobic additives used in embodiments described herein include Tamol® (Rohm and Haas Company) 165A, 731, 2011 and 2001, Disperbyk® (BYK-Chemie GMBH Ltd) 2013, 2015, and 099 and HUER thickeners (Nonionic Polyurethane Associative Thickeners) such as Acrysol® (Rohn and Haas Company) Rm-12w, 8W, 2020, and 995, and Dow Rheolate series, RM-12w, RM-995, RM-8W, and RM-2020NPR, PTFE micro powders for added hydrophobicity, SST®-3 (Shamrock Technologies, Inc.) micro PTFE, hydrophobic wax dispersions, and Ultralube® (Keim-Additec Surface GmbH) E-360 Modified paraffin.

In certain embodiments, the content of the at least one acrylic latex resin within the coating material is about 20-70 weight percent. In other embodiments, the content of the at least one acrylic latex resin within the coating material is about 30-70 weight percent. In other embodiments, the content of the at least one acrylic latex resin within the coating material is about 40-70 weight percent. In other embodiments, the content of the at least one acrylic latex resin within the coating material is about 50-70 weight percent. In other embodiments, the content of the at least one acrylic latex resin within the coating material is about 20-60 weight percent. In other embodiments, the content of the at least one acrylic latex resin within the coating material is about 20-50 weight percent. In other embodiments, the content of the at least one acrylic latex resin within the coating material is about 20-40 weight percent. In other embodiments, the content of the at least one acrylic latex resin within the coating material is about 20-30 weight percent. In other embodiments, the content of the at least one acrylic latex resin within the coating material is about 25-65 weight percent. In other embodiments, the content of the at least one acrylic latex resin within the coating material is about 30-60 weight percent. In other embodiments, the content of the at least one acrylic latex resin within the coating material is about 35-55 weight percent. In other embodiments, the content of the at least one acrylic latex resin within the coating material is about 35-50 weight percent.

In certain embodiments, the content of at least one functional filler within the coating material is about 10-50 weight percent. In other embodiments, the content of at least one functional filler within the coating material is about 10-40 weight percent. In other embodiments, the content of at least one functional filler within the coating material is about 10-30 weight percent. In other embodiments, the content of at least one functional filler within the coating material is about 10-20 weight percent. In other embodiments, the content of at least one functional filler within the coating material is about 20-50 weight percent. In other embodiments, the content of at least one functional filler within the coating material is about 30-50 weight percent. In other embodiments, the content of at least one functional filler within the coating material is about 40-50 weight percent. In other embodiments, the content of at least one functional filler within the coating material is about 15-45 weight percent. In other embodiments, the content of at least one functional filler within the coating material is about 20-45 weight percent. In other embodiments, the content of at least one functional filler within the coating material is about 25-45 weight percent. In other embodiments, the content of at least one functional filler within the coating material is about 30-45 weight percent. In other embodiments, the content of at least one functional filler within the coating material is about 35-40 weight percent.

In certain embodiments, the content of at least one hydrophobic additive is about 0.5-20 weight percent. In other embodiments, the content of at least one hydrophobic additive is about 0.5-10 weight percent. In other embodiments, the content of at least one hydrophobic additive is about 1-5 weight percent. In other embodiments, the content of at least one hydrophobic additive is about 1-3 weight percent. In other embodiments, the content of at least one hydrophobic additive is about 1-2 weight percent.

The coating materials provided herein optionally comprise pigment materials such as titanium dioxide particles. In certain of these embodiments, the content of the pigment is 2-15 weight percent. In other embodiments, the content of the pigment is 3-15 weight percent. In other embodiments, the content of the pigment is 4-15 weight percent. In other embodiments, the content of the pigment is 5-15 weight percent. In other embodiments, the content of the pigment is 6-15 weight percent. In other embodiments, the content of the pigment is 7-15 weight percent. In other embodiments, the content of the pigment is 8-15 weight percent. In other embodiments, the content of the pigment is 9-15 weight percent. In other embodiments, the content of the pigment is 10-15 weight percent. In other embodiments, the content of the pigment is 11-15 weight percent. In other embodiments, the content of the pigment is 12-15 weight percent. In other embodiments, the content of the pigment is 13-15 weight percent. In other embodiments, the content of the pigment is 14-15 weight percent. In other embodiments, the content of the pigment is 2-14 weight percent. In other embodiments, the content of the pigment is 2-13 weight percent. In other embodiments, the content of the pigment is 2-12 weight percent. In other embodiments, the content of the pigment is 2-11 weight percent. In other embodiments, the content of the pigment is 2-10 weight percent. In other embodiments, the content of the pigment is 2-9 weight percent. In other embodiments, the content of the pigment is 2-8 weight percent. In other embodiments, the content of the pigment is 2-7 weight percent. In other embodiments, the content of the pigment is 2-6 weight percent. In other embodiments, the content of the pigment is 2-5 weight percent. In other embodiments, the content of the pigment is 2-4 weight percent. In other embodiments, the content of the pigment is 2-3 weight percent.

In some embodiments, the coating material has a wet tensile strength of at least about 80 psi as measured according to ASTM D882 and/or ASTM D2370.

Coatings made from the coating materials described herein provide excellent resistance against water infiltration. In some embodiments, when the coating material is applied as a coating to the roofing substrate, the coating exhibits a water infiltration depth after 4 hours at 60° C. and 95% relative humidity of about 120 microns or less in some embodiment, about 100 microns or less in other embodiments, about 75 microns or less in other embodiments, about 55 microns or less in other embodiments, and about 35 microns or less in other embodiments. When the coating material is applied as a coating to the roofing substrate, the coating exhibits a wet tensile strength as measured according to ASTM D882 and/or ASTM D2370 of at least about 80 psi in some embodiments, at least 95 psi in other embodiments, and at least 105 psi in other embodiments, at least 120 psi in other embodiments, and at least 130 psi in other embodiments. When the coating material is applied as a coating to the roofing substrate, the coating exhibits a wet adhesion of at least about 2 pli (pounds per linear inch) as measured according to ASTM D903 in some embodiments. In embodiments, when the coating material is applied as a coating to the roofing substrate, the coating exhibits a wet adhesion of about 2 pli to about 15 pli as measured according to ASTM D903. In embodiments, when the coating material is applied as a coating to the roofing substrate, the coating exhibits a wet adhesion of about 3 pli to about 15 pli as measured according to ASTM D903. In embodiments, when the coating material is applied as a coating to the roofing substrate, the coating exhibits a wet adhesion of about 4 pli to about 15 pli as measured according to ASTM D903. In embodiments, when the coating material is applied as a coating to the roofing substrate, the coating exhibits a wet adhesion of about 5 pli to about 15 pli as measured according to ASTM D903. In embodiments, when the coating material is applied as a coating to the roofing substrate, the coating exhibits a wet adhesion of about 6 pli to about 15 pli as measured according to ASTM D903. In embodiments, when the coating material is applied as a coating to the roofing substrate, the coating exhibits a wet adhesion of about 7 pli to about 15 pli as measured according to ASTM D903. In embodiments, when the coating material is applied as a coating to the roofing substrate, the coating exhibits a wet adhesion of about 8 pli to about 15 pli as measured according to ASTM D903. In embodiments, when the coating material is applied as a coating to the roofing substrate, the coating exhibits a wet adhesion of about 9 pli to about 15 pli as measured according to ASTM D903. In embodiments, when the coating material is applied as a coating to the roofing substrate, the coating exhibits a wet adhesion of about 10 pli to about 15 pli as measured according to ASTM D903. In embodiments, when the coating material is applied as a coating to the roofing substrate, the coating exhibits a wet adhesion of about 11 pli to about 15 pli as measured according to ASTM D903. In embodiments, when the coating material is applied as a coating to the roofing substrate, the coating exhibits a wet adhesion of about 12 pli to about 15 pli as measured according to ASTM D903. In embodiments, when the coating material is applied as a coating to the roofing substrate, the coating exhibits a wet adhesion of about 13 pli to about 15 pli as measured according to ASTM D903. In embodiments, when the coating material is applied as a coating to the roofing substrate, the coating exhibits a wet adhesion of about 14 pli to about 15 pli as measured according to ASTM D903.

Examples

Embodiments of the invention are described with reference to the following non-limiting examples. Samples 1-12 were formulated and tested for various mechanical properties as described herein.

Coating formulations were prepared as follows. The grind stage was prepared by adding the water, dispersing agent and wetting agent together and combining. The fillers were then added in stages with short 30 second cycles at 1200 rpm in a counter-rotating planetary speed mixer. The pigment ($TiO_2$) and pigment extender were added together and mixed. The calcium carbonate was then added in two stages. Finally, defoamer and any thickener were added with light stirring and speed mixed for 45 seconds. Once checked for homogeneity, the grind stage was mixed at 1600 rpm for 3 minutes to ensure full dispersion. The letdown stage was performed in a standard high-speed disperser with a Cowles style blade, and each addition was done in rank order shown to incorporate fully before the next addition. Alternatively, similar results were attained by thoroughly hand-stirring each additive into the batch with a spatula and performing a final speed mix of 1 minute at 1200 rpm. Batches were allowed to sit overnight at ambient temperatures in their sealed containers. All batches were speed mixed at 1200 rpm for 1 minute under 26 in Hg of vacuum to de-air the coating before films were drawn down.

Wet tensile testing was performed according to ASTM D882 and/or ASTM D2370 after 24 hours at 72° F. immersion in water. All samples were cut using a six cell die of sample dimensions 0.5"×3". Samples were handled and measured while wet, and blotted dry just before testing.

Water infiltration testing was performed on 2" diameter samples of a 500 micron dry film thickness (dft) coating film placed on a 2" outer diameter Quick-Clamp Sanitary Tube Fitting placed on top of a metal mesh set in a sample tray to allow for air flow to bottom of membrane. About 20 ml of 1% Methylene Blue solution was pipetted into the top section of the fitting. Each sample on its tray was then placed into a stability chamber set to 60° C. at 95% relative humidity for 4 hours. The sample jig was then drained of dye solution, blotted dry and the samples were removed and allowed to cool and dry. Each sample was cut evenly in half with a clean sharp razor blade. Samples were mounted into a micro vise edge up and cross sections were viewed at 200× magnification. The total film thickness and average depth of dye penetration were measured optically and recorded.

For wet adhesion testing, samples were prepared by creating a total of 500 micron dry film thickness (dft) film with an embedment of a reinforcement in size, 5 inches wide and 11 inches long. Samples were drawn down on a 6 inch-by-6 inch sample of 45 mil TPO with TPO Red Primer (GAF Materials Corporation). Silicone caulk was used to seal all edges to prevent lateral water infiltration. The cured samples were placed in pans filled with 1-1.5 inches of deionized water and allowed to rest either at room temperature or at 60° C. for 7 days. The water in the pan was then drained and the samples were tested as per ASTM D903.

Table I provides compositional information for Samples 1-12, and Table II provides test results.

TABLE I

Sample compositions (in weight percent).

| Sample # | Resin | Filler | Hydrophobic Additive | Pigment | Other |
|---|---|---|---|---|---|
| 1 (comparative) | 42% (Acronal 4848) | 36.5% ($CaCO_3$) | None | 6.1% ($TiO_2$) | 10.2% water, 0.57% propylene glycol, 0.46% AntiTerra 250, 0.12% potassium tri-polyphosphate, other inactive ingredients to balance |
| 7 (comparative) | 41.7% (Acronal NX3250M) | 35.9% ($CaCO_3$ + SB-432) | 1.36% (Tamol 901A + Rheolate 1) | 6.1% ($TiO_2$) | 12.2% water, other inactive ingredients to balance |
| 9 (comparative) | 43.6% Rovene 6120 | 36.5% CaCO3 | 0.65% Tamol 165A + Acrysol RM-8W | 6.7% ($TiO_2$) | 10.4% water, other inactive ingredients to balance (other may include surfactants, rheological modifiers, pH modifiers, defoamers) |
| 11 (comparative) | 43.4% Rovene 6120 | 36.5% ATH | 0.95% Tamol 165A + Acrysol RM-8W | 6.7% ($TiO_2$) | 10.2% water, other inactive ingredients to balance |
| 2 | 42% (Acronal 4848) | 36.5% ($CaCO_3$) | 1.45% (Tamol 165A + Acrysol RM-8W) | 6.8% ($TiO_2$) | 10.3% water, 0.57% propylene glycol, other inactive ingredients to balance |
| 3 | 35.6% (Acronal 4848) | 36.4% ($CaCO_3$) | 8.22% (Tamol 165A + Acrysol RM-8W + APS-254) | 6.7% ($TiO_2$) | 10.0% water, 0.55% propylene glycol, other inactive ingredients to balance |

TABLE I-continued

Sample compositions (in weight percent).

| Sample # | Resin | Filler | Hydrophobic Additive | Pigment | Other |
|---|---|---|---|---|---|
| 4 | 41.4% (Syntran 6211) | 36.5% (CaCO$_3$) | 1.25% (Tamol 165A + Acrysol RM-8W) | 6.8% (TiO$_2$) | 10.5% water, 0.55% propylene glycol, other inactive ingredients to balance |
| 5 | 42.3% (Syntran 6211) | 36.4% Camel Wite ST | 0.97% (Tamol 165A + Acrysol RM-8W) | 6.7% (TiO$_2$) | 9.97% water, 0.55% propylene glycol, other inactive ingredients to balance |
| 6 | 27.3% (Syntran 6211) | 36.5% (CaCO$_3$) | 15.9% (Tamol 165A + Acrysol RM-8W + Carapol AAR-127) | 6.7% (TiO$_2$) | 10.0% water, 0.55% propylene glycol, other inactive ingredients to balance |
| 8 | 42% (Acronal NX3250M) | 36.7% (CaCO$_3$ + SB-432 + Oxylink 3101) | 1.05% (Tamol 165A + Acrysol RM-8W + Acrysol RM-2020) | 6.7% (TiO$_2$) | 9% water, 0.57% propylene glycol, 0.3% Carbodilite E-05 (crosslinker) |
| 10 | 43.4% Rovene 6120 | 32.9% CaCO3 and 3.7% Wollastonite | 0.7% Tamol 165A + Acrysol RM-8W | 6.7% (TiO$_2$) | 10.4% water, other inactive ingredients to balance |
| 12 | 42.9% Rovene 6120 | 29.2% ATH and 7.3% Wollastonite | 1% Tamol 165A + Acrysol RM-8W | 6.7% (TiO$_2$) | 10.41% water, other inactive ingredients to balance |

TABLE II

Sample properties (note that Sample numbers correspond with the compositions shown in Table I).

| Sample # | Dry tensile strength (psi) | Wet tensile strength (psi) | Water infiltration microns | 60° C. Wet adhesion, pli |
|---|---|---|---|---|
| 1 (comparative) | 184 | 56 | 158 | 7.5 |
| 7 (comparative) | 158 | 21 | 388 | n/a |
| 9 (comparative) | 181 | 88 | 41 | 3.6 |
| 11 (comparative) | 185 | 108 | 72 | 3.4 |
| 2 | 196 | 92 | 118 | 7.4 |
| 3 | 180 | 97 | 54 | 4.6 |
| 4 | 260 | 87 | 44 | 2.6 |
| 5 | 327 | 95 | 28 | 6.6 |
| 6 | 246 | 85 | 20 | 2 |
| 8 | 192 | 70 | 71 | n/a |
| 10 | 247 | 93 | 40 | 2.8 |
| 12 | 251 | 130 | 66 | 3.7 |

Several observations can be drawn from inspection of Tables I and II. Samples 2 and 3 illustrate the improvement to water infiltration resistance and wet tensile strength compared with Comparative Sample 1. The improvements are believed to result from the use of hydrophobic additives. Samples 5 and 6 illustrate further improvements to the wet tensile strength and/or water infiltration properties of Sample 4, which is based upon a hydrophobic acrylic with high water infiltration resistance. Sample 5 makes use of Camel White™ ST (Imerys), a fine particle size, wet ground white calcitic marble. Sample 6 contains 15 wt % CaraPol AAR-127 as an additional hydrophobic additive. Sample 8 shows a significant improvement over Comparative Sample 7 in wet tensile strength and water infiltration resistance from the addition of nanofiller Oxylink as a functional filler, and crosslinking agent Carbodilite E-05. Sample 10 contains a blend of calcium carbonate and 3.7% wollastonite filler and shows a 36% increase in dry tensile strength relative to the comparative example 9 with only calcium carbonate. Sample 12 contains a blend of hydrophobically modified ATH and 7.3% wollastonite and shows a 36% increase in dry tensile strength and a 20% increase in wet tensile strength relative to the comparative example 11 with only hydrophobically modified ATH.

Conventional terms in the fields of materials science and engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A roofing system comprising:
a roofing substrate; and
a coating on the roofing substrate,
wherein the coating comprises:
20% to 70% by weight of at least one acrylic latex resin based on a total weight of the coating;
25% to 65% by weight of at least one functional filler based on the total weight of the coating;
0.5% to 20% by weight of at least one hydrophobic additive based on the total weight of the coating; and
2% to 15% by weight of at least one pigment based on the total weight of the coating;
wherein the at least one functional filler is different from the at least one pigment;
wherein the at least one acrylic latex resin is selected from the group consisting of hydrophobic resins, self-crosslinking resins, and crosslinkable resins;
wherein the at least one functional filler comprises at least one of a silica, a wollastonite, a mica, a kaolin, a feldspar, a nepheline syenite, an aluminum hydroxide, a magnesium hydroxide, an aluminum trihydrate, a basalt, a nano-zinc oxide, a platy silica, a treated fumed silica, a non-treated fumed silica, a nano-kaolin, a nano-bentonite, a nano-monomonilorite, or any combination thereof;
wherein the at least one hydrophobic additive comprises at least one of a hydrophobic copolymer dispersant, a salt of a hydrophobic copolymer dispersant, a nonionic rheology modifier, a polytetrafluoroethylene (PTFE) powder, a silicone surface additive, a polyolefin powder having a molecular weight of 100 kDa to 1000 kDa, or any combinations thereof;
wherein the coating has a dry film thickness of at least 500 microns;
wherein the coating exhibits a greater dry tensile strength than the same coating without the at least one functional filler.

2. The roofing system of claim 1, wherein the at least one functional filler further comprises at least one of a silicate mineral, a talc, a platy filler, a nanoclay, a nano-oxide material, a calcium carbonate, a barium sulfate, or any combination thereof.

3. The roofing system of claim 1, wherein the coating further comprises a crosslinking agent.

4. A roofing system comprising:
a roofing substrate; and
a coating on the roofing substrate, wherein the coating comprises:
20% to 70% by weight of an acrylic latex resin based on a total weight of the coating;
25% to 65% by weight of a functional filler based on the total weight of the coating;
0.5% to 20% by weight of a hydrophobic additive based on the total weight of the coating; and
2% to 15% by weight of a pigment based on the total weight of the coating;
wherein the pigment is different from the functional filler;
wherein the acrylic latex resin is selected from the group consisting of hydrophobic resins, self-crosslinking resins, and crosslinkable resins;
wherein the functional filler comprises at least one of a nanofiller, a surface-treated filler, a hydrophobic filler, or any combination thereof;
wherein the hydrophobic additive comprises at least one of a hydrophobic copolymer dispersant, a salt of a hydrophobic copolymer dispersant, a nonionic rheology modifier, a polytetrafluoroethylene (PTFE) powder, a silicone surface additive, a polyolefin powder having a molecular weight of 100 kDa to 1000 kDa, or any combinations thereof;

wherein the coating has a dry film thickness of at least 500 microns.

5. The roofing system of claim 4, wherein the functional filler comprises at least one of a silica, a wollastonite, a mica, a kaolin, a feldspar, a nepheline syenite, an aluminum hydroxide, a magnesium hydroxide, an aluminum trihydrate, a basalt, a nano-zinc oxide, a platy silica, a treated fumed silica, a non-treated fumed silica, a nano-kaolin, a nano-bentonite, a nano-monomonilorite, or any combination thereof.

6. The roofing system of claim 4, wherein a content of the acrylic latex resin is 25% to 55% by weight based on a total weight of the coating.

7. The roofing system of claim 4, wherein a content of the functional filler is 35% to 50% by weight based on a total weight of the coating.

8. The roofing system of claim 4, wherein a content of the hydrophobic additive is 1% to 20% by weight based on a total weight of the coating.

9. The roofing system of claim 4, wherein a content of the pigment is 3% to 15% by weight based on a total weight of the coating.

10. The roofing system of claim 4, wherein the coating further comprises a crosslinking agent.

11. The roofing system of claim 4, wherein the coating exhibits a water infiltration depth of 120 microns or less after 4 hours at 60° C. and 95% relative humidity.

12. The roofing system of claim 4, wherein the coating exhibits a wet tensile strength of 80 psi to 500 psi as measured according to ASTM D882 and/or ASTM D2370.

13. The roofing system of claim 4, wherein the coating exhibits a wet adhesion strength of 2 pli to 15 pli as measured according to ASTM D903.

14. A roof coating material, comprising:

20% to 70% by weight of at least one acrylic latex resin based on a total weight of the roof coating material;

25% to 65% by weight of at least one functional filler based on the total weight of the roof coating material, wherein the at least one functional filler has having an aspect ratio of 3 to 100;

0.5% to 20% by weight of at least one hydrophobic additive based on the total weight of the roof coating material; and 2% to 15% by weight of at least one pigment based on the total weight of the roof coating material;

wherein the at least one pigment is different from the at least one functional filler;

wherein the at least one acrylic latex resin is selected from the group consisting of hydrophobic resins, self-crosslinking resins, and crosslinkable resins;

wherein the at least one functional filler comprises at least one of a nanofiller, a surface-treated filler, a hydrophobic filler, or any combination thereof;

wherein the at least one hydrophobic additive comprises at least one of a hydrophobic copolymer dispersant, a salt of a hydrophobic copolymer dispersant, a nonionic rheology modifier, a polytetrafluoroethylene (PTFE) powder, a silicone surface additive, a polyolefin powder having a molecular weight of 100 kDa to 1000 kDa, or any combinations thereof.

15. The roofing system of claim 4, wherein the functional filler further comprises at least one of a silicate mineral, a talc, a platy filler, a nanoclay, a nano-oxide material, a calcium carbonate, a barium sulfate, or any combination thereof.

* * * * *